United States Patent

Scoville et al.

(10) Patent No.: US 10,343,874 B2
(45) Date of Patent: Jul. 9, 2019

(54) WIRELESS DEVICE INSTALLATION INTERFACE

(71) Applicant: Otis Elevator Company, Farmington, CT (US)

(72) Inventors: Bradley Armand Scoville, Farmington, CT (US); Anne R. Davis, Middlefield, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 222 days.

(21) Appl. No.: 15/091,949

(22) Filed: Apr. 6, 2016

(65) Prior Publication Data

US 2017/0291800 A1    Oct. 12, 2017

(51) Int. Cl.
| | |
|---|---|
| *B66B 19/06* | (2006.01) |
| *H04W 76/10* | (2018.01) |
| *B66B 1/46* | (2006.01) |
| *B66B 19/00* | (2006.01) |
| *B66B 1/34* | (2006.01) |

(52) U.S. Cl.
CPC ............ *B66B 19/06* (2013.01); *B66B 1/3407* (2013.01); *B66B 1/468* (2013.01); *B66B 19/00* (2013.01); *H04W 76/10* (2018.02); *B66B 2201/4653* (2013.01)

(58) Field of Classification Search
CPC ........ H04W 76/02; B66B 19/06; B66B 1/468; B66B 2201/4653
See application file for complete search history.

(56) References Cited

U.S. PATENT DOCUMENTS

| | | | |
|---|---|---|---|
| 7,298,275 B2 | 11/2007 | Brandt et al. | |
| 7,436,797 B2 | 10/2008 | Shepard | |
| 7,551,087 B2 | 6/2009 | McAllister | |
| 7,675,935 B2 | 3/2010 | Samudrala | |
| 8,271,946 B2 | 9/2012 | Budmiger | |
| 8,290,437 B2 | 10/2012 | Simons | |
| 8,385,978 B2 | 2/2013 | Leung | |
| 8,422,401 B1* | 4/2013 | Choong | H04L 12/2827 370/254 |
| 8,428,264 B2 | 4/2013 | Maestrini et al. | |
| 8,437,276 B2 | 5/2013 | Dinur | |
| 8,581,707 B2 | 11/2013 | Bucci | |

(Continued)

FOREIGN PATENT DOCUMENTS

| | | |
|---|---|---|
| CN | 103676795 A | 3/2014 |
| EP | 2852184 A1 | 3/2015 |

(Continued)

OTHER PUBLICATIONS

European Search Report for application EP 17165157, dated Aug. 30, 2017, 8 pages.

(Continued)

*Primary Examiner* — Duc C Ho

(74) *Attorney, Agent, or Firm* — Cantor Colburn LLP

(57) ABSTRACT

A system and a method of connecting to wireless hardware of an elevator system during installation are provided. The method includes detecting, using a mobile device, a sensor of the wireless hardware within range, connecting the mobile device and sensor using a wireless connection, and configuring a parameter of the sensor using the mobile device through the wireless connection to the sensor.

19 Claims, 6 Drawing Sheets

(56) References Cited

U.S. PATENT DOCUMENTS

| | | |
|---|---|---|
| 8,655,995 B2 | 2/2014 | Elston, III |
| 8,660,121 B2 | 2/2014 | McCormack |
| 8,787,171 B2 | 7/2014 | MacNaughtan |
| 8,913,746 B2 | 12/2014 | Ware |
| 8,994,493 B2 | 3/2015 | Nakamoto |
| 9,191,886 B2 | 11/2015 | Ludlow |
| 9,198,204 B2 | 11/2015 | Matthews et al. |
| 9,210,581 B2 | 12/2015 | Toepke et al. |
| 9,252,980 B2 | 2/2016 | Raman |
| 9,282,427 B2 | 3/2016 | Hill et al. |
| 9,445,240 B2 * | 9/2016 | Gooch ............... H04W 4/04 |
| 2002/0032028 A1 | 3/2002 | Kaupe |
| 2005/0071498 A1 | 3/2005 | Farchmin |
| 2007/0151809 A1 | 7/2007 | Tyni et al. |
| 2007/0232288 A1 | 10/2007 | McFarland |
| 2008/0062981 A1 | 3/2008 | Gerstenkorn |
| 2009/0042593 A1 | 2/2009 | Yavuz et al. |
| 2011/0025469 A1 | 2/2011 | Erdmann |
| 2012/0096131 A1 | 4/2012 | Bhandari et al. |
| 2012/0115424 A1 | 5/2012 | Knibbe et al. |
| 2012/0267203 A1 | 10/2012 | Friedl et al. |
| 2013/0109406 A1 | 5/2013 | Meador et al. |
| 2013/0141223 A1 | 6/2013 | Brandsma |
| 2014/0023336 A1 * | 1/2014 | Mast .................. H04N 5/765 386/200 |
| 2014/0025186 A1 | 1/2014 | Ojha |
| 2014/0032972 A1 | 1/2014 | Ramachandra |
| 2014/0179259 A1 * | 6/2014 | Liu .................. H04W 4/029 455/404.2 |
| 2014/0229735 A1 | 8/2014 | Holleis |
| 2014/0328211 A1 | 11/2014 | Holleis |
| 2014/0364056 A1 * | 12/2014 | Belk .................. H04B 5/0031 455/41.1 |
| 2015/0229488 A1 | 8/2015 | Averitt |
| 2015/0229516 A1 | 8/2015 | Thanos |
| 2015/0341222 A1 | 11/2015 | McCormack |
| 2015/0373555 A1 | 12/2015 | Xu |
| 2016/0014873 A1 | 1/2016 | Bello et al. |
| 2016/0127931 A1 * | 5/2016 | Baxley ................ G01S 5/0263 455/67.16 |
| 2016/0194181 A1 * | 7/2016 | Wang ................. B66B 1/468 348/77 |
| 2017/0179988 A1 * | 6/2017 | Caballero ............. H04B 1/385 |
| 2017/0225334 A1 * | 8/2017 | Deyle .................. B25J 9/1679 |

FOREIGN PATENT DOCUMENTS

| | | |
|---|---|---|
| WO | 2014094981 A2 | 6/2014 |
| WO | WO2014202676 A1 | 12/2014 |
| WO | WO2015114577 A1 | 8/2015 |
| WO | WO2015162549 A1 | 10/2015 |
| WO | 2017050785 A1 | 3/2017 |

OTHER PUBLICATIONS

European Office Action for application EP 17165157.3, dated Aug. 3, 2018, 4 pages.

* cited by examiner

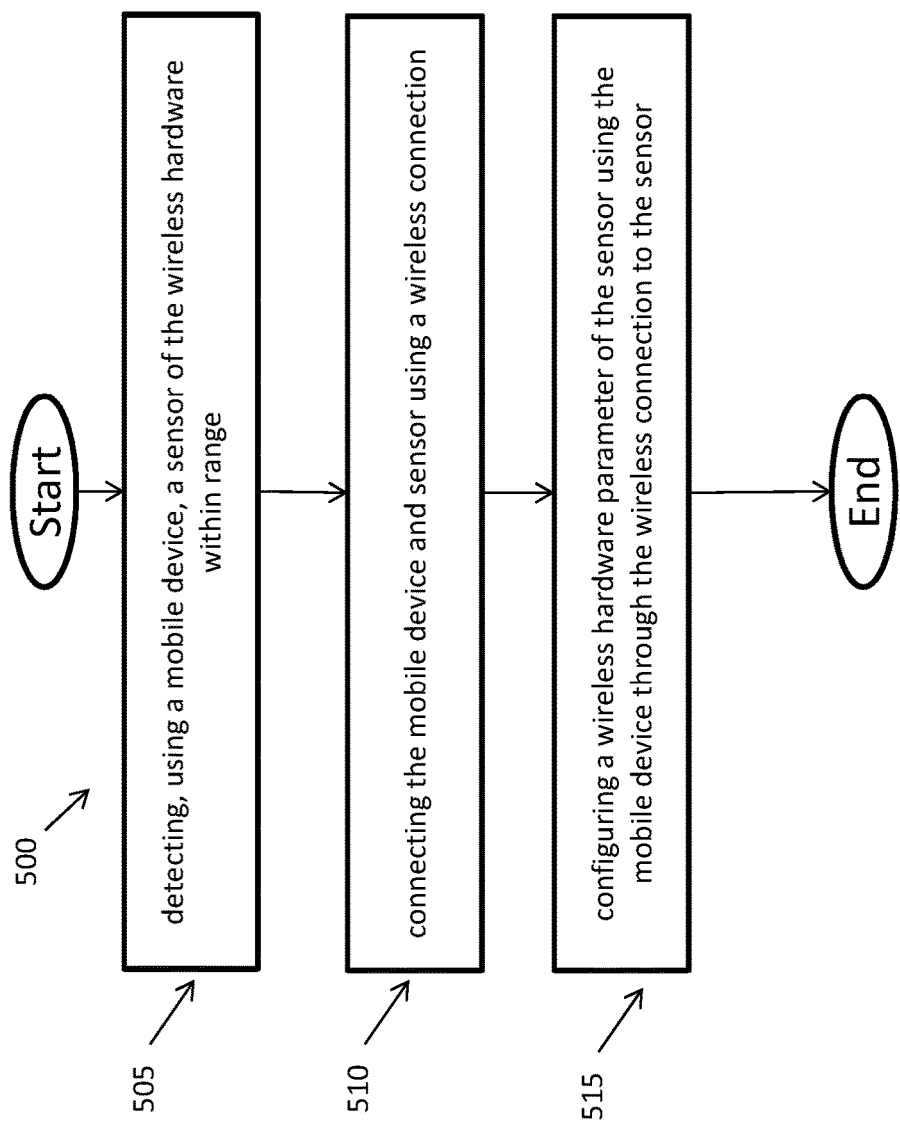

WIRELESS DEVICE INSTALLATION INTERFACE

TECHNICAL FIELD

The subject matter disclosed herein generally relates to setting up wireless sensors and devices, and more specifically, to a system and method for an installer setting up wireless sensors and devices.

DESCRIPTION OF RELATED ART

Currently, an elevator user management system may utilize mobile devices in which users can call for elevators. In some embodiments, this feature may require new wireless hardware be installed on each floor of a building in which the elevators are located. This new hardware would communicate with the mobile users, and typically needs to be commissioned by an installer or mechanic. Current installation practices for general wireless hardware are typically cumbersome with complicated connection processes and/or a need to initially plug in the wireless device using a cable in order to setup the wireless hardware.

Accordingly, there exists a desire for improved setup methods and systems for wireless sensors and devices.

SUMMARY

According to one embodiment a method of connecting to wireless hardware of an elevator system during installation is provided. The method includes detecting, using a mobile device, a sensor of the wireless hardware within range, connecting the mobile device and sensor using a wireless connection, and configuring a parameter of the sensor using the mobile device through the wireless connection to the sensor.

In addition to one or more of the features described above, or as an alternative, further embodiments may include wherein connecting the mobile device and sensor using the wireless connection includes transmitting, from the mobile device, a connection request to connect with the sensor to the controller, and communicatively connecting, using the controller, the mobile device and the sensor.

In addition to one or more of the features described above, or as an alternative, further embodiments may include wherein configuring the parameter of the sensor includes setting wireless transmission strength of the sensor, wherein sensor transmissions cover a select area based on the wireless transmission strength.

In addition to one or more of the features described above, or as an alternative, further embodiments may include wherein configuring the parameter of the sensor includes setting a select area that the sensor can broadcast within by setting the wireless transmission strength, wherein the outer limit of the select area is defined by the position of the installer at the time of setting the select area.

In addition to one or more of the features described above, or as an alternative, further embodiments may include wherein detecting the sensor includes broadcasting, from the mobile device, an identification and connection request, and receiving, at the mobile device, a sensor connection broadcast from the sensor when in range of the mobile device, in response to the identification and connected request broadcast from the mobile device.

In addition to one or more of the features described above, or as an alternative, further embodiments may include wherein connecting the mobile device and sensor includes displaying the detected sensor on a display of the mobile device, receiving a selection input from the installer that indicates the detected sensor is selected, and connecting the mobile device and sensor based on the selection input.

In addition to one or more of the features described above, or as an alternative, further embodiments may include wherein configuring the parameter includes displaying the parameter on the mobile device, receiving a configuration input from the installer, and setting the parameter of the sensor based on the configuration input from the installer.

In addition to one or more of the features described above, or as an alternative, further embodiments may include wherein the parameter is one selected from a group consisting of a wireless range, a building ID, a sensor ID, a system ID, a current floor, and a sensor position.

In addition to one or more of the features described above, or as an alternative, further embodiments may include wherein configuring the mobile device and sensor further includes placing the wireless hardware in a setup mode in which the wireless hardware is configured to receive and implement new parameter values.

In addition to one or more of the features described above, or as an alternative, further embodiments may include wherein configuring the mobile device and sensor further includes placing the wireless hardware in a learning mode in which a wireless range can be set by the installer including tracking distance between the installer mobile device and the wireless hardware, receiving a set range command from the installer mobile device, and setting the wireless range to the tracked distance between the installer mobile device and the wireless hardware.

In addition to one or more of the features described above, or as an alternative, further embodiments may include detecting, using the mobile device, a plurality of wireless hardware devices within range, and displaying the plurality of wireless hardware devices on the mobile device for installer selection.

According to an embodiment a system for wireless device installation interface with a mobile device is provided. The system includes a sensor including a wireless communication device, a mobile device that detects the sensor of wireless hardware within range, connects the mobile device and sensor using a wireless connection, and configures a parameter of the sensor using the mobile device through the wireless connection to the sensor, and an elevator configured to call a car based on the configured parameter.

According to an embodiment a computer program product for connecting to wireless hardware of an elevator system is provided. The computer program product including a computer readable storage medium having program instructions embodied therewith, the program instructions executable by a processor to cause the processor to detect, using a mobile device, a sensor of the wireless hardware within range, connect the mobile device and sensor using a wireless connection, and configure a parameter of the sensor using the mobile device through the wireless connection to the sensor.

In addition to one or more of the features described above, or as an alternative, further embodiments may include additional program instructions executable by the processor to cause the processor to broadcast, from the mobile device, an identification and connection request, and receive, at the mobile device, a sensor connection broadcast from the sensor when in range of the mobile device, in response to the identification and connected request broadcast from the mobile device.

In addition to one or more of the features described above, or as an alternative, further embodiments may include additional program instructions executable by the processor to cause the processor to display the detected sensor on a display of the mobile device, receive a selection input from the installer that indicates the detected sensor is selected, and connect the mobile device and sensor based on the selection input.

In addition to one or more of the features described above, or as an alternative, further embodiments may include additional program instructions executable by the processor to cause the processor to display the parameter on the mobile device, receive a configuration input from the installer, and set the parameter of the sensor based on the configuration input from the installer.

In addition to one or more of the features described above, or as an alternative, further embodiments may include additional program instructions executable by the processor, wherein the parameter is one selected from a group consisting of a wireless range, a building ID, a sensor ID, a system ID, a current floor, and a sensor position.

In addition to one or more of the features described above, or as an alternative, further embodiments may include additional program instructions executable by the processor to cause the processor to place the wireless hardware in a setup mode in which the wireless hardware is configured to receive and implement new parameter values.

In addition to one or more of the features described above, or as an alternative, further embodiments may include additional program instructions executable by the processor to cause the processor to place the wireless hardware in a learning mode in which a wireless range can be set by the installer, track distance between the installer mobile device and the wireless hardware, receive a set range command from the installer mobile device, and set the wireless range to the tracked distance between the installer mobile device and the wireless hardware.

In addition to one or more of the features described above, or as an alternative, further embodiments may include additional program instructions executable by the processor to cause the processor to detect, using the mobile device, a plurality of wireless hardware devices within range, and display the plurality of wireless hardware devices on the mobile device for installer selection.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which:

FIG. 5 depicts a flow diagram of a method of wireless device installation setup in accordance with one or more embodiments of the present disclosure.

DETAILED DESCRIPTION

Figure 1:
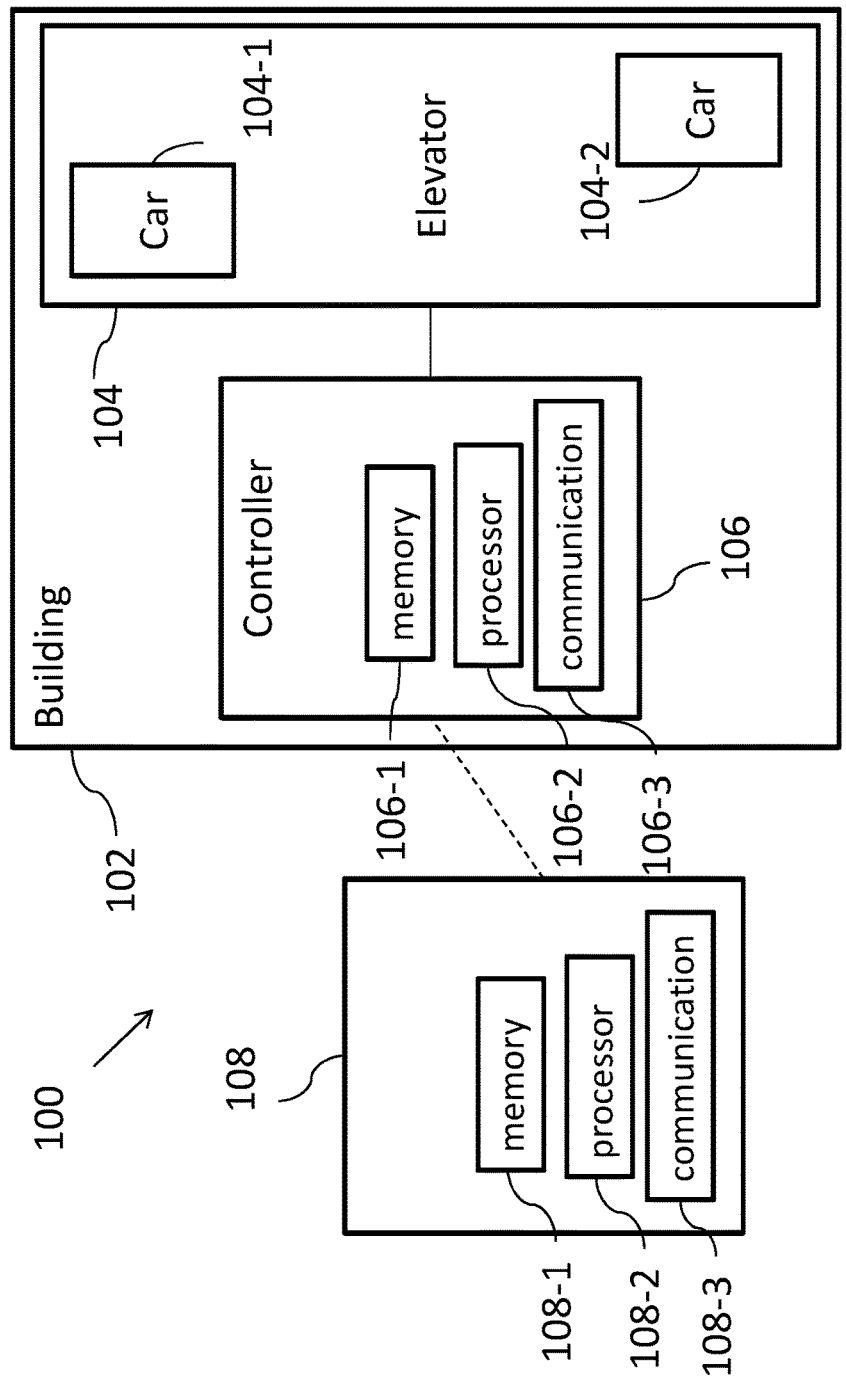
FIG. 1 depicts an elevator system in accordance with one or more embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to a method and system for utilizing a graphic interface for wireless device installation. This interface includes a means to commission the wireless hardware through the wireless communication, as the installer has an application that can communicate with the wireless device and place it into setup mode. In so doing, the installer can establish a variety of settings for each element of wireless hardware, including but not limited to, wireless range, building ID, floor ID, or elevator ID, that are required for installation and use of wireless communications required for a passenger management system to function. Additionally, there may be an option for the installer to use this interface to view device logs and debug the entire elevator system.

Turning now to the figures, FIG. 1 depicts an elevator system 100 in accordance with one or more embodiments. The elevator system 100 is shown installed at a building 102. In some embodiments, the building 102 may be an office building or a collection of office buildings that may or may not be physically located near each other. The building 102 may include a number of floors. Persons entering the building 102 may enter at a lobby floor, or any other floor, and may go to a destination floor via one or more conveyance devices, such as an elevator 104.

The elevator 104 may be coupled to one or more computing devices, such as a controller 106. The controller 106 may be configured to control dispatching operations for one or more elevator cars (e.g., cars 104-1, 104-2) associated with the elevator 104. The elevator cars 104-1 and 104-2 may be located in the same hoist way or in different hoist ways so as to allow coordination amongst elevator cars in different elevator banks serving different floors. It is understood that other components of the elevator system 100 (e.g., drive, counterweight, safeties, etc.) are not depicted for ease of illustration.

Also shown in FIG. 1 is a mobile device 108. The mobile device 108 may include a device that is typically carried by a person, such as a phone, PDA, electronic wearable, RFID tag, laptop, tablet, watch, or any other known portable mobile device. The mobile device 108 may include a processor 108-2, a memory 108-1, and a communication module 108-3 as shown in FIG. 1. The processor 108-2 can be any type or combination of computer processors, such as a microprocessor, microcontroller, digital signal processor, application specific integrated circuit, programmable logic device, and/or field programmable gate array. The memory 108-1 is an example of a non-transitory computer readable storage medium tangibly embodied in the mobile device 108 including executable instructions stored therein, for instance, as firmware. The communication module 108-3 may implement one or more communication protocols as described in further detail herein.

The controller 106 may include a processor 106-2, a memory 106-1, and communication module 106-3 as shown in FIG. 1. The processor 106-2 can be any type or combination of computer processors, such as a microprocessor, microcontroller, digital signal processor, application specific integrated circuit, programmable logic device, and/or field programmable gate array. The memory 106-1 is an example of a non-transitory computer readable storage medium tangibly embodied in the controller 106 including executable instructions stored therein, for instance, as firmware. The communication module 106-3 may implement one or more communication protocols as described in further detail herein.

The mobile device 108 and the controller 106 communicate with one another. According to one or more embodiments, the communication between the mobile device 108 and the controller 106 is done through other systems such as transmitters, converters, receivers, and other transmitting and processing elements depending on the communication type selected. For example, the mobile device 108 and the controller 106 may communicate with one another when proximate to one another (e.g., within a threshold distance). The mobile device 108 and the controller 106 may communicate over a wireless network, such as 802.11x (WiFi), short-range radio (Bluetooth), or any other known type of wireless communication. In some embodiments, the controller 106 may include, or be associated with (e.g., communicatively coupled to) a networked element, such as kiosk, beacon, hall call fixture, lantern, bridge, router, network node, etc. The networked element may communicate with the mobile device 108 using one or more communication protocols or standards. For example, the networked element may communicate with the mobile device 108 using near field communications (NFC), or any type of known wired or wireless communication means. According to one or more other embodiments, the networked element may communicate with the mobile device 108 through a cellular network or over the internet through a number of other devices outside the building.

In other embodiments, the controller 106 may establish communication with a mobile device 108 that is outside of the building 102. This connection may be established with various technologies including GPS, triangulation, or signal strength detection, by way of non-limiting example. The communication connection that can be established includes, but is not limited to, a cellular connection, a WiFi connection, a Bluetooth connection, a peer-to-peer connection, a satellite connection, a NFC connection, some other wireless connection, and even a wired connection using an Ethernet cable, coaxial cable, or other data cable. These communication connections may transport data between the mobile device 108 using a number of different networks ranging from a private secure direct communication link to transporting the data over the internet through multiple different servers, switches, etc. Such technologies that allow early communication will provide users and the systems more time to establish the most efficient passenger flow, and may eliminate the need for a user to stop moving to interact with the system.

Implementation of a method and system of commissioning wireless hardware that includes sensors and devices using the mobile device, controller, and elevator is described with reference to FIGS. 2-5.

Figure 2:
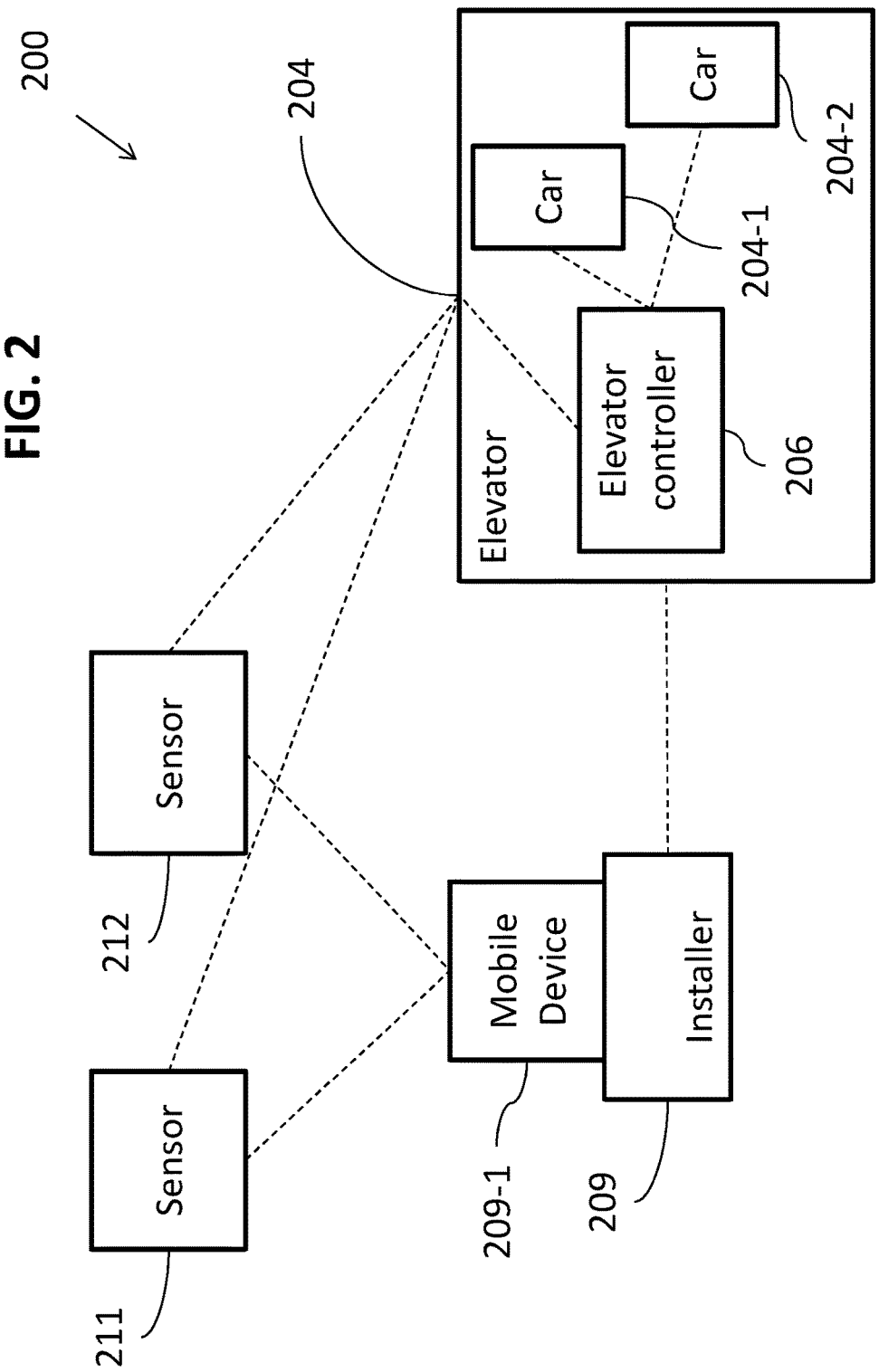
FIG. 2 depicts another elevator system including an installer mobile device in accordance with one or more embodiments of the present disclosure.

Referring to FIG. 2, an elevator system 200 including an installer 209 and mobile device 209-1 is shown according to one or more embodiments. The elevator system 200 includes at least the wireless hardware installer 209 with a mobile device 209-1. This mobile device 209-1 is able to communicate with a sensor 211 wirelessly. Similarly, the installer's mobile device 209-1 can communicate with an additional sensor 212 wirelessly. In some embodiments, there may be any number of sensors greater than 2.

Each sensor (e.g., 211, 212) collects information about one or more users of the elevators (e.g., 204). In other embodiments, the sensors 211, 212 are not assigned to specific elevators 204 or cars 204-1, 204-2, but instead gather information relating to user and/or elevator movements within their range, including but not limited to usage of different cars or elevators, weight in different cars or elevators, or temperature of different cars or elevators. The sensor 212 communicates with the elevator controller 206 and collects information that the elevator controller gathers and maintains about users as well as each elevator car (e.g., 204-1 and 204-2).

For example, some sensor types that may be install include wireless internet routers that can not only provide internet connection to mobile devices but can also serve to detect the location of connected devices based on transmission values between the mobile device and sensor including but not limited to signal to noise ratio (SNR), dropped packet count, data throughput, ping time, and signal strength. According to another embodiment, other wireless sensor may be included such as image sensors. An image sensor can be used to detect movement, and also can capture images or videos that can be processed such that people and objects can be detected, identified, and located. Further, other sensors that may be used include wireless microphones, wireless motion sensors, wireless weight plates, and wireless input kiosks or wall panels as well as other sensor types. Other sensors could also be included that provide information that is useful to the elevator system. All these sensors may be of varying type, size, complexity, and communication scheme, software platforms, etc. while still also having to undergo installation and maintenance. Thus, one or more embodiments as disclosed herewith provide an installer the ability to connect wirelessly to any of the sensors when the installer is within a certain range. Additionally, the installer than select and adjust the wireless transmission range for each sensor for both installation purposes and system usage.

Further, according to one or more embodiments, the installer 209 connects to a sensor 211, 212 using a mobile device 209-1. When connected, the installer 209 can see the current parameters and properties of the sensor and can adjust them as needed to setup the sensor or device to work as desired within the overall elevator system 200 and as described in more detail below. The installer 209 connects to the sensors 211, 212 using a wireless connection between the mobile device 209-1 and any sensor that is in range. Thus, when the installer 209 is in a range of a sensor 211, the installer mobile device 209-1 wirelessly connects to the sensor 211 and displays the sensor and received properties on the mobile device 209-1. The installer 209 can then setup the sensor values through the wireless connection. For example, the installer 209 can setup a wireless range, building ID, sensor ID, Floor ID, and other parameters of the sensor. According to another embodiment, the installer connects to the sensors 211, 212 through a communication path including the controller 206. For example, the location of the installer 209 can be determined using the sensors 211, 212 or received from the installer 209 at the controller 206. The controller 206 can then provide a communication path to a sensor 211 and/or 212 that is determined to be in range of the location of the installer 209. This is helpful, for example, in the case of sensors that are provided with a sleep setting during which no communication is possible unless awakened by the controller 206. Also, this allows the installer 209 to have a simpler communication device that is able to communicate with the controller 206 shifting the burden to the controller 206 on how to communicate with all the different sensors 211, 212.

In accordance with one or more embodiments, the ability for an installer to tune a wireless range provides control and tuning capability of the range in which a passenger can interact with the system through that particular sensor point. According to another embodiment, the building ID provides context to a mobile device so the application can retrieve settings particular to that building. Further, according to another embodiments, the floor ID informs the user of where they are and removes the requirement of them to tell the system where they are.

Similarly, when the installer 209 is in wireless range of the sensor 212, the sensor 212 and its related information appears on the mobile device 209-1 so that the installer 209 can adjust and setup the wireless sensor 212. As shown, the mobile device 209-1 of the installer 209 can be within range of more than one sensor at a time or can be positioned to only be in range of one sensor.

According to one or more embodiments, the visual appearance of sensors in range on the mobile device of the installer provides the installer with a visual representation of available sensors that may be initially installed or updated without the installer having to find and connect to each individually. Further, according to another embodiment, this ability for the installer to visualize sensors as the installer moves within wireless range of the sensors makes setting the transmission signal strength value an efficient and straight forward process. For example, an installer can walk down a hallway in a building that has multiple wireless routers positioned along the hallway. As the installer initially walks down the hall the installer may see that a first sensor at a first end is still in range at the other second end of the hallway so a user would never need to switch off the first sensor. Thus, the user would appear to still be down at the first end despite having moved down the hall to the second end. Accordingly, the installer can then adjust the transmission signal strength down for the first sensor so that it only covers an area at the first end and then can similarly adjust the second sensor at the second end. Accordingly, now when a user travels down the hall, the user mobile device will lose contact with the first sensor but will then enter the range of the second sensor and switch its connection. Thus the sensors can more accurately detect were users are within the building based on the sensor the mobile device is connected to.

According to another embodiment, the installer 209 and mobile device 209-1 can connect to other devices that are part of the elevator system that can communicate wirelessly so that the installer 209 can also setup those devices in a similar fashion through a proximity based wireless connection.

Further, while setting up a sensor or device, the installer may select to specifically adjust the wireless transmission range of a sensor or device to increase or decrease the range of operation. This can be done by adjusting, the transmission strength and/or frequency and transmission scheme among other adjusts. By adjusting the transmission range of a sensor or device, the installer can limit sensor overlap and inadvertent connections to the sensor from other floors in the building. According to one embodiment, the installer can set this range by using a learning mode of a sensor or device. For example, the installer can put the wireless device in the learning mode and then the installer can travel to a desired transmission range edge. From this one the installer can notify the wireless device to use the current position of the installer as the far edge transmission. The wireless device can then adjust parameters to make the installer select distance the set transmission and receiving distance for that sensor.

Further, returning to FIG. 2, as shown the sensors 211, 212 can communicate wirelessly with the mobile device 209-1 and can also communicate with the elevator 204. The sensors 211, 212 communicate with the elevator through wireless channels or through a wired connection. The sensors 211, 212 can therefore transmit collected information about user's position, direction, size, shape, identification, etc. to the elevator 204 for use in more accurately calling cars 204-1, 204-2 using the elevator controller 206 which processes and calculates calls based on received sensor data as well as user input.

Figure 3A:
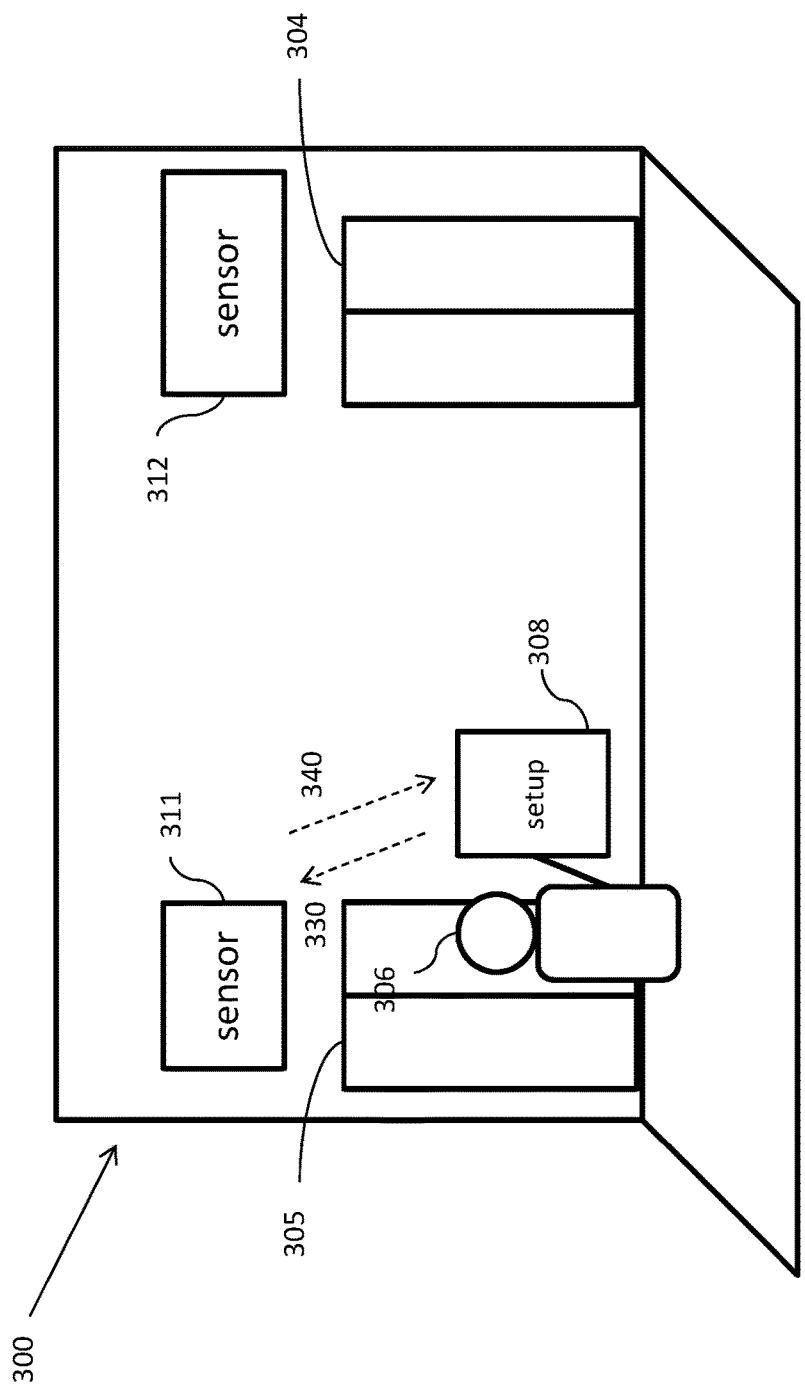
FIGS. 3A and 3B depict an elevator lobby that includes an elevator system in accordance with one or more embodiments of the present disclosure.

Referring to FIG. 3A, an elevator lobby that includes an elevator system is shown according to one or more embodiments. As shown, the elevator lobby 300 includes a first elevator car entrance 304 and second elevator car entrance 305. The elevator lobby also includes a sensor 312 and a sensor 311. The placement is merely an example, as the sensor 311 and sensor 312 may be placed elsewhere on that floor of the building. As shown, a user/installer 306 may be in proximity to a sensor 311. When the installer 306 is within range, the sensor 311 will be displayed on the mobile device 308 of the installer. The installer can then transmit adjustments to parameters and other installation information 330 and can also receive diagnostic information as well as current values of parameters from the sensor 340.

Figure 3B:
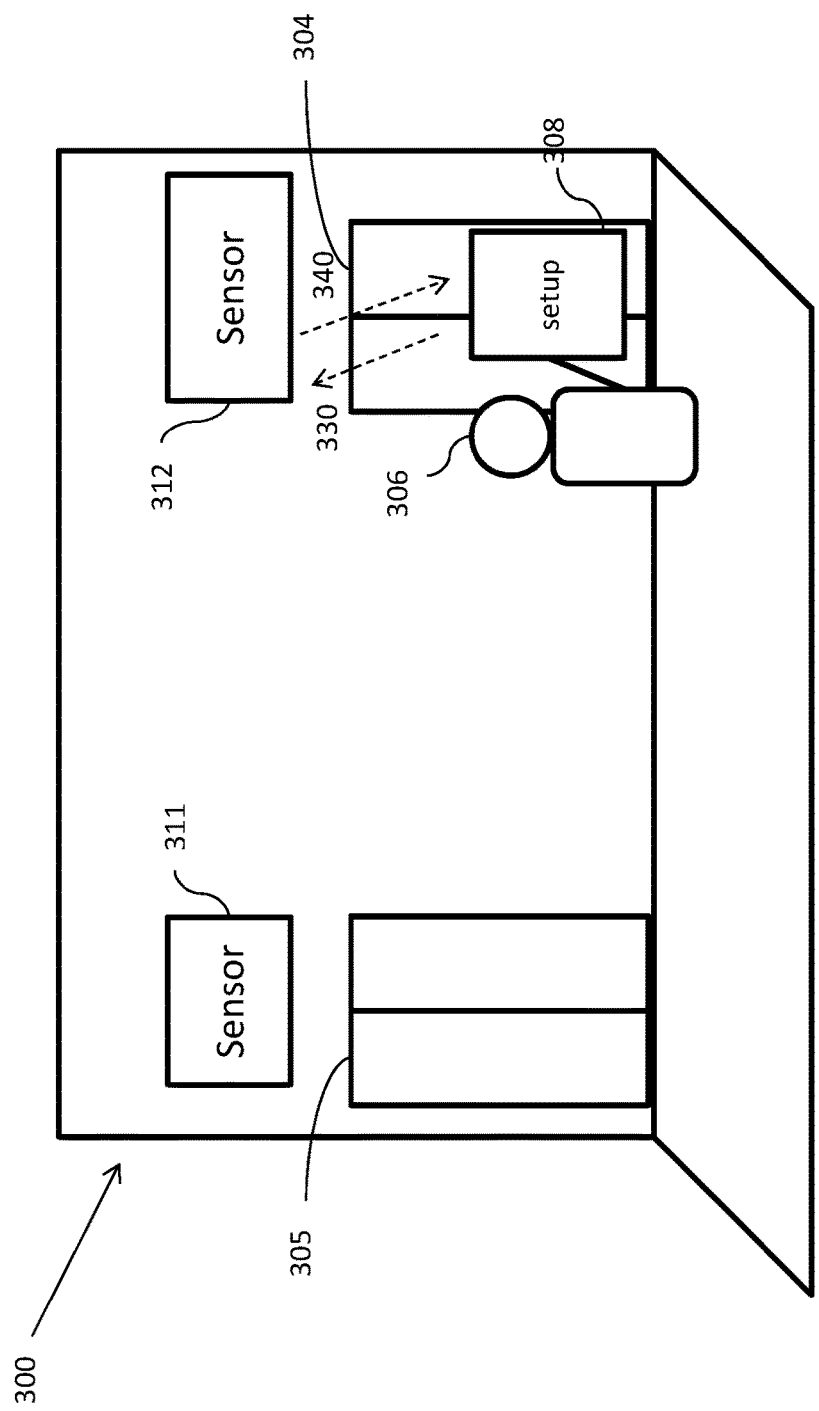

Further, as shown in FIG. 3B, as the installer 306 moves out of range of the sensor 311 and into range of the sensor 312, the mobile device 308 of the installer 306 may leave the transmission area of the sensor 311 and enter the transmission area of the sensor 312. When the mobile device 308 is in range it will transmit adjustments to parameters and other installation information 330 and can also receive diagnostic information as well as current values of parameters from the sensor 340.

Figure 4:
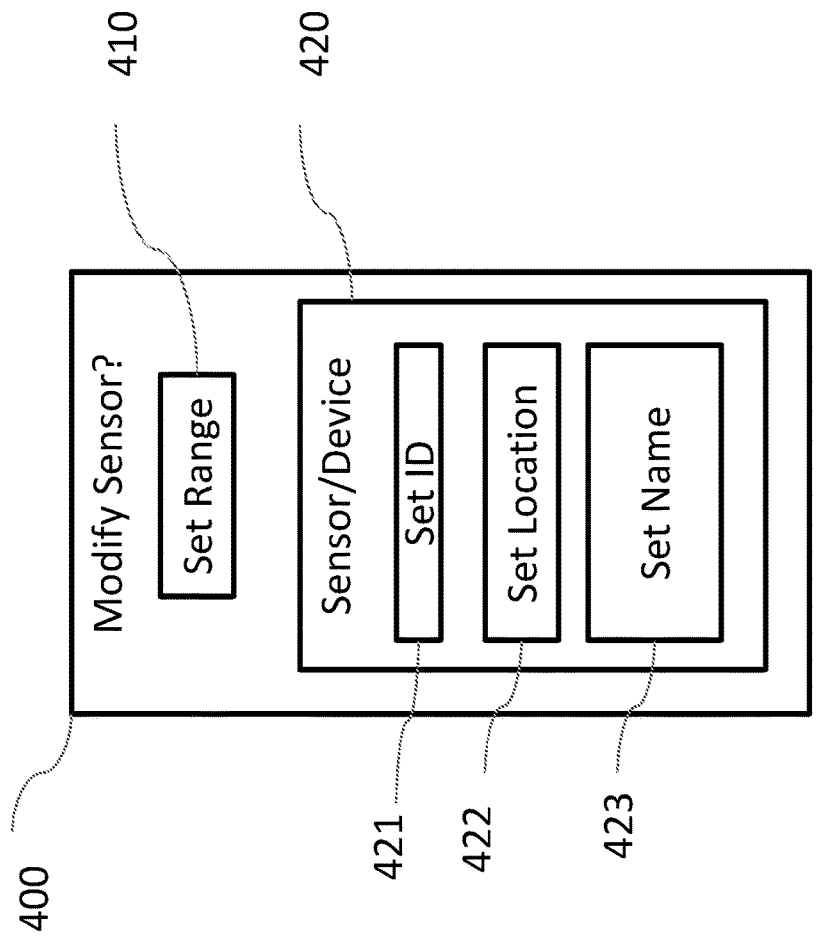
FIG. 4 depicts a graphical user interface for an installer mobile device in accordance with one or more embodiments of the present disclosure.

FIG. 4 depicts a graphical user interface (GUI) for the mobile device of the installer in accordance with one or more embodiments of the present disclosure. As shown, the GUI 400 is provided on a screen that includes a few input buttons that correspond to options for the installer to install/modify properties of a sensor being installed. For example, the installer may select the "Set Range" 410 button for setting the transmission range of the sensor. Further, as shown, the installer may be provided a list of possible actions 420 such as setting the ID 421, setting the location 422, and setting a name 423. In one embodiment, any number or type of desired diagnostic and tuning functions may be displayed and altered on the screen 400. According to an embodiment, the location 422 includes location on the floor and distance/direction relative to all elevator doors.

FIG. 5 depicts a flow diagram of a method 500 of wireless device installation setup in accordance with one or more embodiments of the present disclosure. The method includes detecting, using a mobile device, a sensor of the wireless hardware within range (operation 505). The method also includes connecting the mobile device and sensor using a wireless connection (operation 510). Further, the method includes configuring a wireless hardware parameter of the sensor using the mobile device through the wireless connection to the sensor (operation 515).

According to another embodiment, during initial setup the installer may see multiple devices on his application loaded on his install mobile device. All of the new wireless sensors may initially only show serial numbers without any additional information. The installer can then travel to each of the wireless sensor to help determine which sensor matched the shown serial number. The installer can match the sensors and serial numbers using the detected signal strength as he approaches each sensor. For example, the installer can walk near a first new wireless sensor and place his mobile device near the wireless sensor ensuring that the first new wireless sensor is the nearest sensor to his device. The installer can then monitor parameter values such as signal strength and SNR and ping to determine which serial number corresponds to the sensor he is currently near. Once the installer has matched each sensor in the application the installer can set the remaining parameters for each sensor. Particularly, at that point the installer knows which device he is communicating with and can setup the parameters of that device so it is not a generic out-of-the-factory device but one setup to work in the building at the specifically installed location.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable program instructions may execute entirely on the user's mobile device, partly on the user's mobile device, as a stand-alone software package, partly on the user's mobile device and partly on a remote computer or entirely on the remote computer or server. In the latter scenario, the remote computer may be connected to the user's mobile device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:
1. A method of connecting to wireless hardware of an elevator system during installation, the method comprising:
  detecting, using a mobile device, a sensor of the wireless hardware within range;
  connecting the mobile device and sensor using a wireless connection; and configuring a parameter of the sensor using the mobile device through the wireless connection to the sensor;
wherein configuring the parameter of the sensor includes setting wireless transmission strength of the sensor;
wherein setting the wireless transmission strength of the sensor comprises setting a select area that the sensor can broadcast within by setting the wireless transmission strength, wherein the outer limit of the select area is defined by the position of the installer at the time of setting the select area.

2. The method of claim 1, wherein connecting the mobile device and sensor using the wireless connection comprises:
transmitting, from the mobile device, a connection request to connect with the sensor to a controller; and
communicatively connecting, using the controller, the mobile device and the sensor.

3. The method of claim 1, wherein sensor transmissions cover a select area based on the wireless transmission strength.

4. The method of claim 1, wherein detecting the sensor comprises:
broadcasting, from the mobile device, an identification and connection request; and
receiving, at the mobile device, a sensor connection broadcast from the sensor when in range of the mobile device, in response to the identification and connected request broadcast from the mobile device.

5. The method of claim 1, wherein connecting the mobile device and sensor comprises:
displaying the detected sensor on a display of the mobile device;
receiving a selection input from the installer that indicates the detected sensor is selected; and
connecting the mobile device and sensor based on the selection input.

6. The method of claim 1, wherein configuring the parameter comprises:
displaying the parameter on the mobile device;
receiving a configuration input from the installer; and
setting the parameter of the sensor based on the configuration input from the installer.

7. The method of claim 1, wherein configuring the mobile device and sensor further comprises:
placing the wireless hardware in a setup mode in which the wireless hardware is configured to receive and implement new parameter values.

8. The method of claim 1, further comprising:
detecting, using the mobile device, a plurality of wireless hardware devices within range; and
displaying the plurality of wireless hardware devices on the mobile device for installer selection.

9. A method of connecting to wireless hardware of an elevator system during installation, the method comprising:
detecting, using a mobile device, a sensor of the wireless hardware within range;
connecting the mobile device and sensor using a wireless connection; and
configuring a parameter of the sensor using the mobile device through the wireless connection to the sensor;
wherein the parameter is one selected from a group consisting of a wireless range, a building ID, a sensor ID, a system ID, a current floor, and a sensor position.

10. A method of connecting to wireless hardware of an elevator system during installation, the method comprising:
detecting, using a mobile device, a sensor of the wireless hardware within range;
connecting the mobile device and sensor using a wireless connection; and
configuring a parameter of the sensor using the mobile device through the wireless connection to the sensor;
wherein configuring the sensor further comprises:
placing the wireless hardware in a learning mode in which a wireless range can be set by an installer comprising:
tracking distance between the mobile device and the wireless hardware;
receiving a set range command from the mobile device; and
setting the wireless range to the tracked distance between the mobile device and the wireless hardware.

11. A system for wireless device installation interface with a mobile device, the system comprising:
a sensor comprising a wireless communication device;
a mobile device that detects the sensor of wireless hardware within range, connects the mobile device and sensor using a wireless connection, and configures a parameter of the sensor using the mobile device through the wireless connection to the sensor; and
an elevator controller configured to call a car based on the configured parameter;
wherein configuring the parameter of the sensor includes setting wireless transmission strength of the sensor;
wherein setting the wireless transmission strength of the sensor comprises setting a select area that the sensor can broadcast within by setting the wireless transmission strength, wherein the outer limit of the select area is defined by the position of the installer at the time of setting the select area.

12. A computer program product for connecting to wireless hardware of an elevator system, the computer program product comprising a non-transitory computer readable storage medium having program instructions embodied therewith, the program instructions executable by a processor to cause the processor to:
detect, using a mobile device, a sensor of the wireless hardware within range;
connect the mobile device and sensor using a wireless connection; and
configure a parameter of the sensor using the mobile device through the wireless connection to the sensor;
wherein configuring the parameter of the sensor includes setting wireless transmission strength of the sensor;
wherein setting the wireless transmission strength of the sensor comprises setting a select area that the sensor can broadcast within by setting the wireless transmission strength, wherein the outer limit of the select area is defined by the position of the installer at the time of setting the select area.

13. The computer program product of claim 12, the computer program product comprising additional program instructions executable by the processor to cause the processor to:
broadcast, from the mobile device, an identification and connection request; and
receive, at the mobile device, a sensor connection broadcast from the sensor when in range of the mobile device, in response to the identification and connected request broadcast from the mobile device.

14. The computer program product of claim 12, the computer program product comprising additional program instructions executable by the processor to cause the processor to:
display the detected sensor on a display of the mobile device;

receive a selection input from the installer that indicates the detected sensor is selected; and
connect the mobile device and sensor based on the selection input.

15. The computer program product of claim 12, the computer program product comprising additional program instructions executable by the processor to cause the processor to:
display the parameter on the mobile device;
receive a configuration input from the installer; and
set the parameter of the sensor based on the configuration input from the installer.

16. The computer program product of claim 12, the computer program product comprising additional program instructions executable by the processor to cause the processor to:
place the wireless hardware in a setup mode in which the wireless hardware is configured to receive and implement new parameter values.

17. The computer program product of claim 12, the computer program product comprising additional program instructions executable by the processor to cause the processor to:
detect, using the mobile device, a plurality of wireless hardware devices within range; and
display the plurality of wireless hardware devices on the mobile device for installer selection.

18. A computer program product for connecting to wireless hardware of an elevator system, the computer program product comprising a non-transitory computer readable storage medium having program instructions embodied therewith, the program instructions executable by a processor to cause the processor to:
detect, using a mobile device, a sensor of the wireless hardware within range;
connect the mobile device and sensor using a wireless connection; and
configure a parameter of the sensor using the mobile device through the wireless connection to the sensor;
wherein configuring the parameter of the sensor includes setting wireless transmission strength of the sensor;
wherein the parameter is one selected from a group consisting of a wireless range, a building ID, a sensor ID, a system ID, a current floor, and a sensor position.

19. A computer program product for connecting to wireless hardware of an elevator system, the computer program product comprising a non-transitory computer readable storage medium having program instructions embodied therewith, the program instructions executable by a processor to cause the processor to:
detect, using a mobile device, a sensor of the wireless hardware within range;
connect the mobile device and sensor using a wireless connection; and
configure a parameter of the sensor using the mobile device through the wireless connection to the sensor;
wherein configuring the parameter of the sensor includes:
placing the wireless hardware in a learning mode in which a wireless range can be set by an installer;
tracking distance between the mobile device and the wireless hardware;
receive a set range command from the mobile device; and
setting the wireless range to the tracked distance between the mobile device and the wireless hardware.

* * * * *